United States Patent [19]
Heine et al.

[11] Patent Number: 5,653,540
[45] Date of Patent: Aug. 5, 1997

[54] HYDRODYNAMIC BEARING ASSEMBLY WITH SINGLE SIDED GROOVED COUNTERPLACE

[75] Inventors: Gunter Heine, Aptos; Hans Leuthold, Santa Cruz; Lakshman Nagarathnam, Capitola; David Jennings, Santa Cruz; Norbert S. Parsoneault, Watsonville, all of Calif.

[73] Assignee: Seagate Technology, Inc., Scotts Valley, Calif.

[21] Appl. No.: 545,514

[22] Filed: Oct. 19, 1995

Related U.S. Application Data

[63] Continuation-in-part of Ser. No. 279,199, Jul. 22, 1994, Pat. No. 5,533,812.

[51] Int. Cl.$^6$ ............................................. F16C 32/06
[52] U.S. Cl. .................. 384/123; 384/121; 384/107; 384/112
[58] Field of Search ........................... 384/100, 107, 384/112, 121, 123

[56] References Cited

U.S. PATENT DOCUMENTS 3,368,851  2/1968  Eggmann ............................ 384/121
5,427,456  6/1995  Hensel ........................... 384/123 X
5,433,529  7/1995  Hensel ........................... 384/123 X

FOREIGN PATENT DOCUMENTS 1222275  2/1971  United Kingdom ................ 384/112

Primary Examiner—Thomas R. Hannon
Attorney, Agent, or Firm—Flehr Hohbach Test Albritton & Herbert LLP

[57] ABSTRACT

A spindle motor includes a rotating hub for supporting one or more discs in a disc drive, and a hydrodynamic bearing system for supporting a hub for rotation, the bearing system includes a sleeve and a shaft fitted into an axial bore of the sleeve. The shaft and the sleeve rotate freely relative to one another, and together, define a journal bearing. The shaft supports an annular thrust plate. The thrust plate extends into a recess formed by an axial face stepped into the sleeve and a counterplate parallel to the axial face and the thrust plate and attached to the sleeve. A first surface of the thrust plate faces the axial face of the sleeve which has a groove pattern formed on it. A surface of the counterplate faces an opposed, second surface of the thrust plate which has a groove pattern formed on it, to form an effective fluid pumping system in the hydrodynamic bearing.

22 Claims, 4 Drawing Sheets

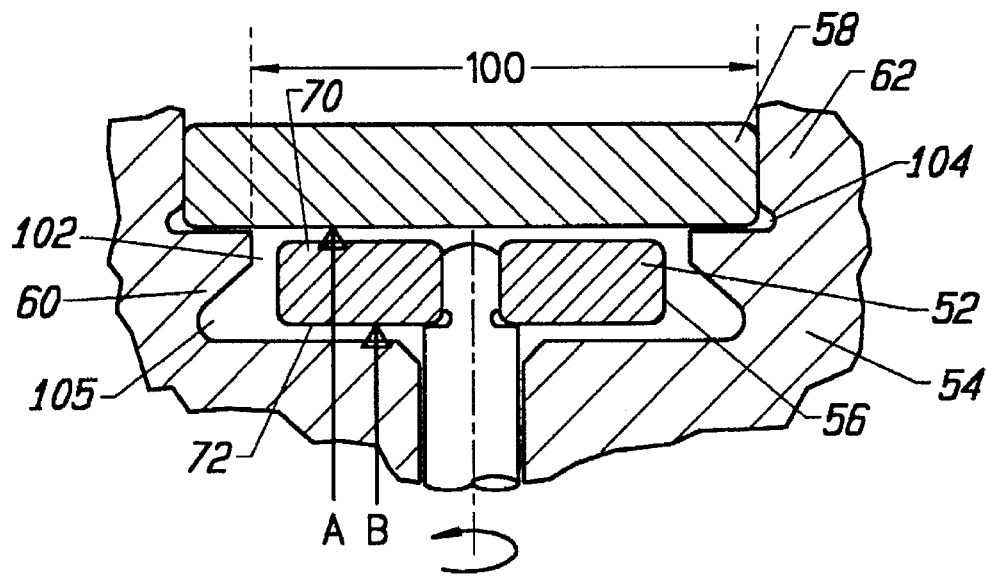
FIG. 3
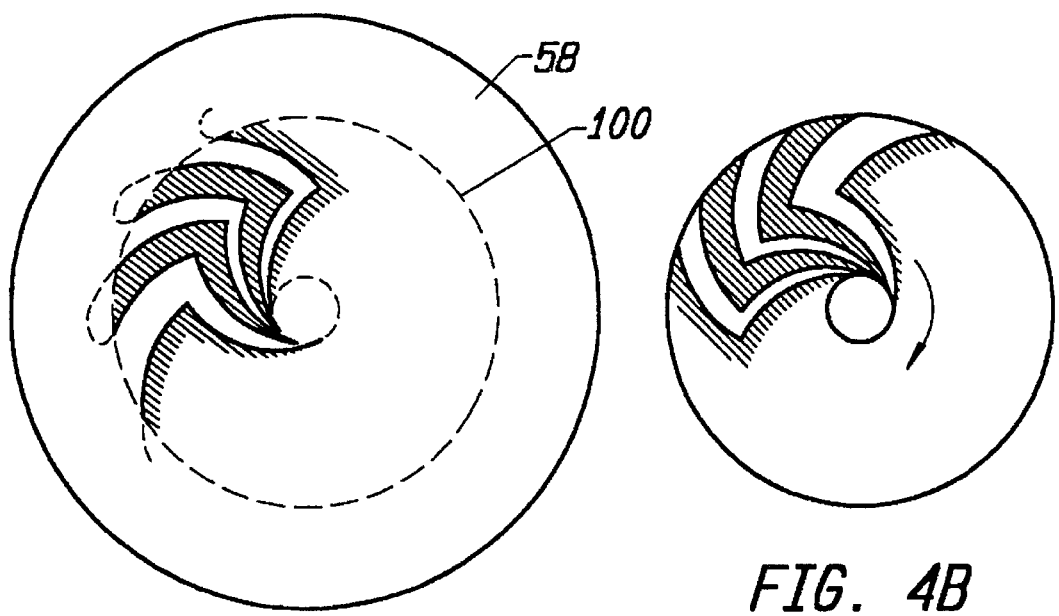
FIG. 4A
FIG. 4B

HYDRODYNAMIC BEARING ASSEMBLY WITH SINGLE SIDED GROOVED COUNTERPLACE

RELATED APPLICATIONS

This application is a continuation-in-part of U.S. Pat. No. 5,533,812 issued Jul. 9, 1996 entitled "SINGLE PLATE HYDRODYNAMIC BEARING WITH SELF-BALANCING FLUID LEVELS" by Leuthold, et al U.S. application Ser. No. 08/279,199, filed Jul. 22, 1994. incorporated herein by reference; the invention is related to and may be used in common with the invention disclosed in U.S. patent application, Ser. No. 08/503,568 filed Jul. 18, 1995 entitled "VACUUM FILL TECHNIQUE FOR HYDRODYNAMIC BEARING" by Parsoneault, et al. U.S. patent application, Ser. No. 08/521,611 filed Aug. 30, 1995 entitled "ABSORBENT OIL BARRIER FOR HYDRODYNAMIC BEARING" by Parsoneault, et al. and U.S. Pat. No. 5,487,608 issued Jan. 30, 1996 entitled "SINGLE PLATE HYDRODYNAMIC BEARING WITH SELF-BALANCING FLUID LEVEL AND FLUID CIRCULATION" by Leuthold, et al., all of said applications being assigned to the assignee of the present invention and incorporated herein by reference.

FIELD OF THE INVENTION

The present invention relates to the field of hydrodynamic bearing assemblies of the type which provide support and rotation for high speed spindle element. More specifically, the present invention relates to hydrodynamic bearing assemblies utilized in the computer disc drive recording system.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle, the information being accessed by means of read/write heads generally located on a pivoting arm which moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub or below the discs. One type of motor in common use is known as an in-hub or in-spindle motor. Such known in-spindle motors typically have a spindle mounted by means of two ball bearing systems to a motor shaft disposed in the center of the hub. One of the bearings is typically located near the top of the spindle and the other near the bottom. These bearings allow for rotational movement between the shaft and the hub while maintaining accurate alignment of the spindle to the shaft. The bearings themselves are normally lubricated by grease or oil.

The conventional bearing system described above is prone, however, to several shortcomings. First is the problem of vibration generated by the balls rolling on the raceways. Ball bearings used in hard disk drive spindles run under conditions that generally guarantee physical contact between raceways and balls, this in spite of the lubrication layer provided by the bearing oil or grease. Hence, bearing balls running on the generally even and smooth, but microscopically uneven and rough raceways, transmit this surface structure as well as their imperfections in sphericity in the form of vibration to the rotating disk. This vibration results in misalignment between the data tracks and the read/write transducer. This source of vibration limits therefore the data track density and the overall performance of the disc drive system.

Another problem is related to the application of hard disk drives in portable computer equipment and the resulting requirements for shock resistance. Shocks create relative acceleration between the disks and the drive casting which in turn shows up as a force across the bearing system. Since the contact surfaces in ball bearings are very small, the resulting contact pressures may exceed the yield strength of the bearing material and leave permanent deformation and damage on raceways and balls.

Moreover, mechanical bearings are not always scalable to smaller dimensions. This is a significant draw back since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing and the rotating spindle or rotating hub and the stationary surrounding portion of the motor. For example, liquid lubricants comprising oil, more complex ferromagnetic fluids, or even air have been utilized for use in hydrodynamic bearing systems. The reason for the popularity of the use of air is the importance of avoiding the outgassing of contaminants into the sealed area of the head disc housing. However, air does not provide the lubricating qualities of oil. Its low viscosity requires smaller bearing gaps and therefore higher tolerance standards to achieve similar dynamic performance.

Thus, in the case of a hydrodynamic bearing employing a liquid lubricant, the lubricating fluid itself must be sealed within the bearing to avoid loss of lubricant which results in reduced bearing load capacity. Otherwise the physical surfaces of the spindle and housing would contact one another, leading to increased wear and eventual failure of the bearing system. Equally seriously, the failure of such a seal or other effort to contain the lubricant within the bearing system would cause the entry of contaminants into the head disc region of the disc drive.

Typically, in the prior art, seals for sealing the fluid within the disc drive utilize a pressurized film on the surface of the liquid air interface. In the case of bearing assemblies which employ ferro-magnetic fluids, the seal is achieved by the means of a magnetic field established at each end of the bearing. However, such seals have not been demonstrated to be reliably effective over a long period of time.

Other obvious shortcomings include the fact that many prior art hydrodynamic bearing assemblies frequently require large or bulky structural elements for supporting the axial and radial loads, as such hydrodynamic bearings do not have the inherent stiffness which results from mechanical bearing assemblies. It is difficult to scale the structural support elements to fit within the smaller disc drive dimensions currently in consumer demands. In other instances, hydrodynamic bearing assemblies suffer from the disadvantages of requiring extremely tight clearances and alignments; this burden makes it difficult to manufacture such assemblies since even a small deviation or aberration can lead to faulty bearings.

Another difficulty with assembly of known hydrodynamic bearing systems is that an essential part of the bearing is the formation of patterns of grooves on one of the two facing surfaces which form the bearing. Such patterns or grooves are quite difficult to form, especially in designs where the grooves run all the way to the edge of a flat surface, or where the entire grooved surface must be an effective part of the bearing. The most economical way to form these patterns is stamping or coining. Typically, especially at the edges of the pattern, stress raisers appear during the coining process, which interfere with the establishment of the desired pressure distribution patterns within the bearing.

In some hydrodynamic bearing designs, a thrust plate is utilized which extends perpendicular to the rotating shaft or surfaces. Such thrust plate has in the past frequently required a pattern of grooves on both sides. It is very difficult to stamp or groove a plate on both sides, much more difficult than to stamp the plate only on one side. Such stamping and grooving efforts can again lead to distortions in the thrust plate or stress ridges on the surface of the thrust plate. Since hydrodynamic bearing assemblies suffer from the different disadvantages of requiring extremely tight clearances and alignments, such problems quickly lead to faulty bearings since even a small deviation or aberration in the formation of the groove or stamping of the thrust plate can impose sufficient distortion to overcome the narrow margins or clearances which are allowed for assembly.

SUMMARY OF THE INVENTION

It is therefore an objective of the present invention to provide a hydrodynamic bearing which is extremely simple and highly scalable for use within an information storage unit such as a computer disc drive system.

It is a further purpose of the present invention to provide a hydrodynamic bearing design in which any flood pieces such as the thrust plate are stamped or grooved on a single surface only.

It is a further objective of the invention to provide a method and design for a thrust plate/counterplate combination wherein the grooving is more repeatably and reliably achieved, without stress edges or risers being formed.

These and other objectives of the present invention are achieved in a hydrodynamic bearing including a shaft and sleeve which are relatively rotatable. At or near one end, the shaft supports a thrust plate, which rotates within a recess in the sleeve. The thrust plate rotates within a recess in the sleeve, one side of the thrust plate supports a pattern of grooves, to establish the proper fluid distribution in the bearing. Facing the opposite side of the thrust plate, a counterplate is provided which itself has a grooved surface necessary to provide the fluid distribution and pressure distribution to support the smooth rotation of the hydrodynamic bearing. The groove pattern on the counterplate is of sufficient extent to extend beyond the recess in the sleeve, so that in fact a portion of the grooved pattern is facing and abut an end portion of the sleeve. In this way, the ends of the groove pattern, which are frequently imperfect and have stress ridges or other details which may interfere with the proper distribution of the fluid are masked from the fluid bearing by the abutment of the counterplate with the sleeve.

Other features and advantages of the present invention will become apparent to a person of skill in the art who studies the description of a preferred embodiment given in conjunction with the accompanying drawings.

BRIEF DESCRIPTION OF THE DRAWINGS

FIG. 3 is an exploded sectional view of a detailed portion of the invention;

and FIGS. 4A and 4B are details of the bearing surfaces of the thrust plate and counterplate utilized in the present invention.

Other features and advantages of the present invention will become apparent to a person of skill in the art who studies the following detailed description of a preferred embodiment given in conjunction with the accompanying drawings.

DETAILED DESCRIPTION OF THE PREFERRED EMBODIMENT

A spindle motor and disc assembly for use in a disc drive computer system is disclosed. The specific purpose of the present invention is to modify the design of a hydrodynamic bearing so that it is easier to design and manufacture the thrust plate which rotates with the shaft. A more general purpose is to provide a spindle motor incorporating a hydrodynamic bearing for the main rotating or stationary shaft for use in a hard disc drive application, where the thrust plate which extends perpendicular to the shaft and carries grooves for distributing the fluid in the hydrodynamic bearing and creating the pressure distribution which is necessary to maintain the stiffness of the bearing is easier to manufacture.

Figure 1:
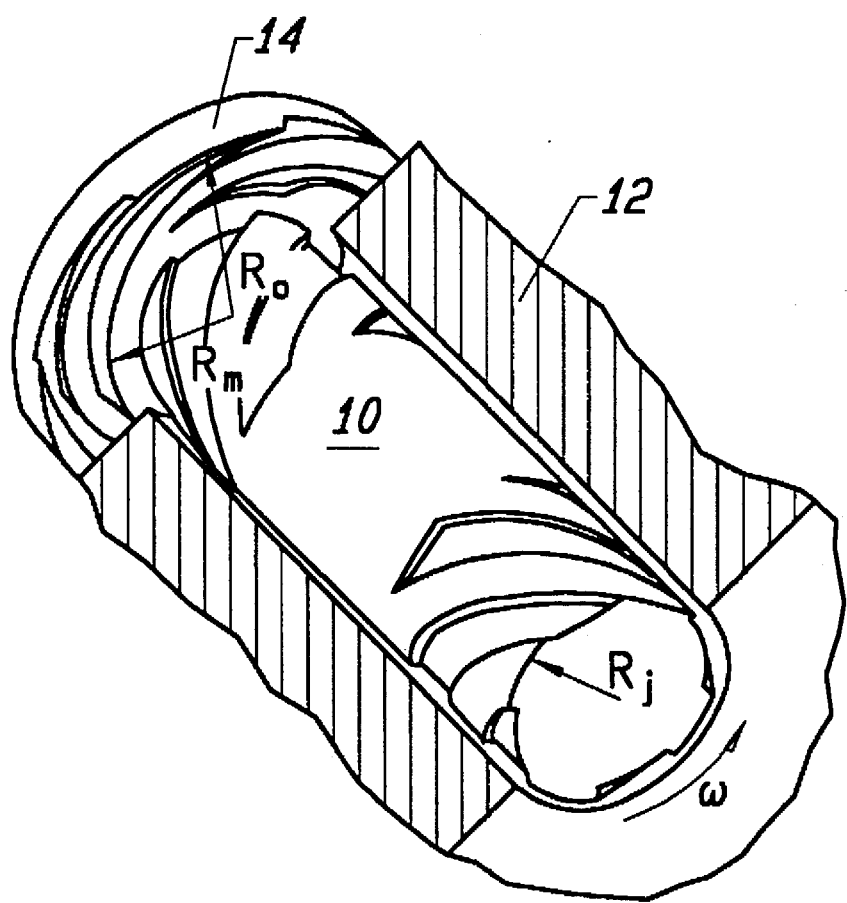
FIG. 1 is a vertical sectional view of a fluid dynamic bearing incorporated in a spindle motor usable in a disc drive incorporating the features of the present invention.

The improved hydrodynamic bearing of the present invention is based on some known principles of the technology, an example of which is shown in FIG. 1. As shown in that figure, a journal bearing incorporating a shaft 10 rotating inside a bushing or sleeve 12, has one of the two opposing surfaces, in this case the shaft, carrying cylindrical sections of spiral grooves. A thrust plate 14, rotating in a recess in the sleeve 12, is also provided with concentric spiral groove sections as shown. The relative rotation of the shaft and sleeve combination pumps the fluid as a function of the direction and angle of the grooves with respect to the sense of rotation of the shaft 10 and thrust plate 14. Pumping action builds up multiple pressure in zones along the journal and thrust plate, maintaining a fluid film between the relatively rotating parts, and providing stiffness for the bearing.

Figure 2A:
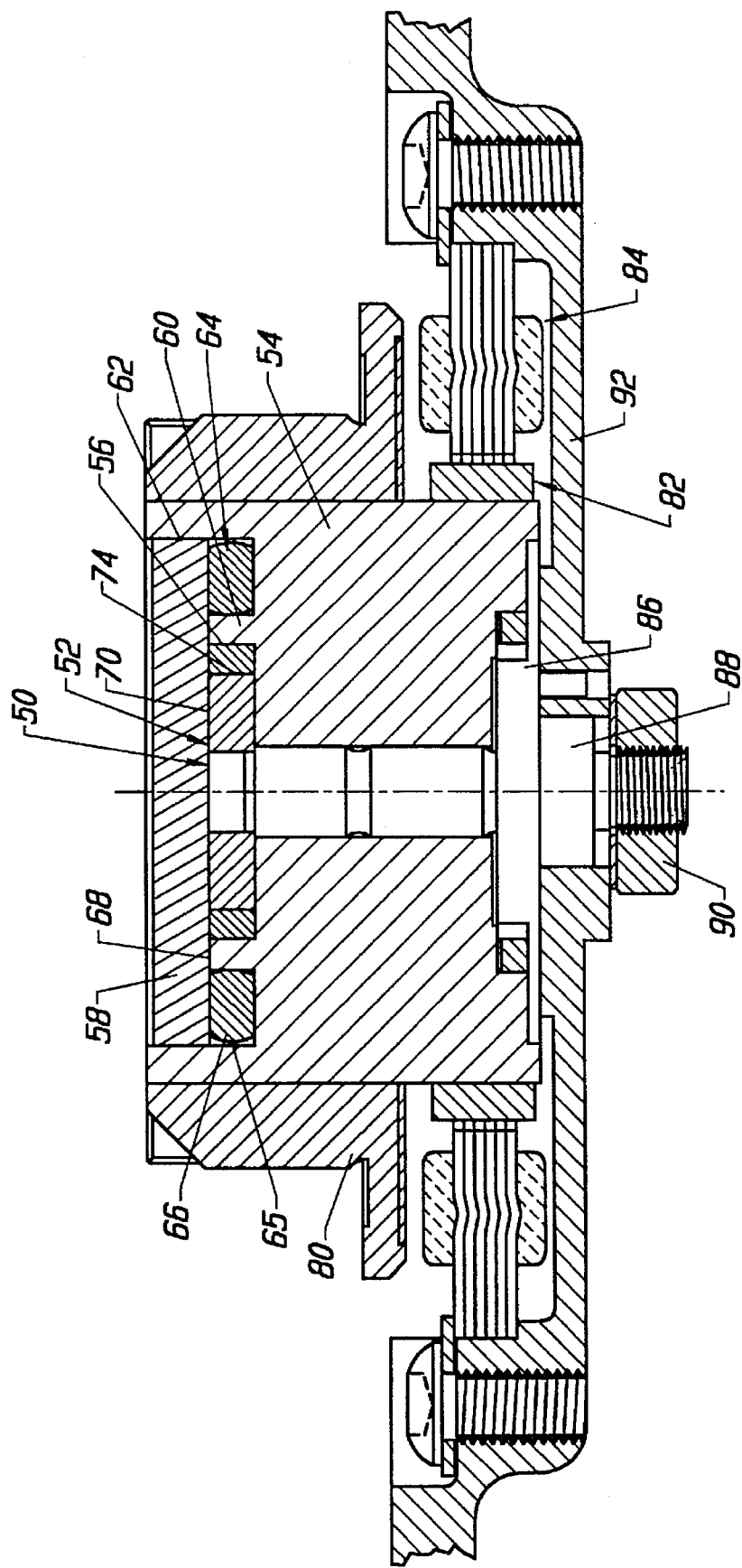
FIG. 2A is a vertical sectional view of a spindle motor incorporating the thrust bearing of the present invention.
Figure 2B:
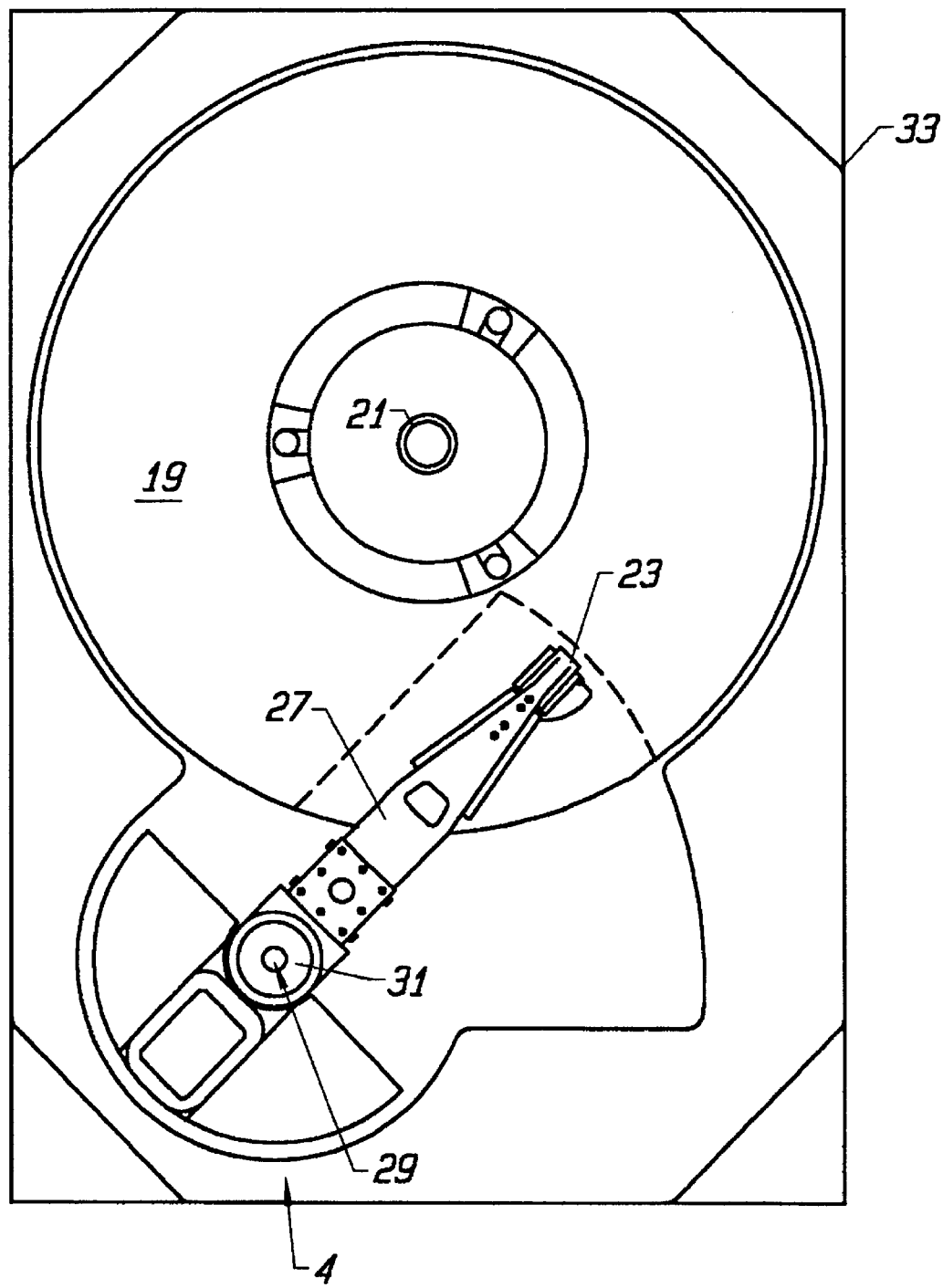
FIG. 2B is a top plan view of a disc drive in which the present invention is useful.

A motor of the type in which such a hydrodynamic bearing is useful is shown in FIG. 2. The motor shown in FIG. 2 is especially adapted for use in a disc drive of the type shown in FIG. 2B. This top plan view illustrates the basic elements of the drive including the rotating disc or discs 19 which are rotated by the spindle 21 of the spindle motor of FIG. 2A. As the discs rotate, a transducer 23 mounted on an end of an actuator arm 27 is selectively positioned by a voice coil motor 29 rotating about a pivot 31 to move the transducer 23 from track to track over the surface of the disc.

Returning to FIG. 2A, the figure shows in vertical section a spindle motor of a type which is especially useful in a disc drive. The motor includes a shaft 50 having a thrust plate 52 on one end in a design similar to that disclosed with respect to FIG. 1. The shaft 50 is fixed relative to the rotating sleeve 54; the thrust plate is fixed within a recess 56 in the hub 54. A counterplate 58 is provided, resting on and pressed against an annular ring section 60 of the sleeve 54. The outer diameter of the counterplate 58 is pressed inside shoulder 62 of the sleeve 54. An O-ring 64 is provided in the recess 66 between the annular ring 60 and the shoulder 62, with the flexible O-ring 64 filling the depth of the recess 66 and pressing tightly against the bottom surface 68 of the counterplate 58. The lubricating fluid of the hydrodynamic bearing, in addition to circulating between the surfaces of the shaft 50 and sleeve 54, also circulates over both the upper and lower surfaces 70, 72 of the thrust plate 52 as well as around the outside diameter 74 of the thrust plate.

The features described to this point comprise the primary features of a hydrodynamic bearing cartridge which is useful in a number of environments. To incorporate the cartridge into a disc drive, a hub 80 is added to the outer surface of the sleeve 54 and rotates with the sleeve. The rotating sleeve also supports, below the hub, a magnet 82 which interacts with a stator 84 to cause rotation of the sleeve and the hub 80 that it supports. The motor shaft 50 ends in a shoulder 86 with a support plate 88 and lock nut 90 assembling the hydrodynamic bearing into a base 92 which would typically form the lower portion of the housing of a disc drive. One or more discs which are not shown in this figure but which are generally indicated at 19 in FIG. 2B are supported on the outer surface of the hub or sleeve.

Referring next to FIG. 3, the specific features and modifications incorporated in the present invention can be more clearly understood by a study of this figure which shows in exaggerated detail the counterplate 58 fixed within the sleeve 54 and the thrust plate 52 rotating in the recess 56 of the sleeve. In this particular figure, the O-ring 64 is not illustrated; the rationale for providing the O-ring is discussed in U.S. patent application Ser. No. 08/503,568 filed Jul. 18, 1995 entitled "VACUUM FILL TECHNIQUE FOR HYDRODYNAMIC BEARING" by Parsoneault, et al. and will be referred to further below.

As already discussed, and as can be more clearly seen in the exaggerated view of FIG. 3, lubricating fluid is flowing over the upper surface 70 and lower surface 72 of the thrust plate 52. According to the approaches taken in the known prior art, the fluid flow over these upper and lower thrust plate surfaces was controlled and the proper pressure distributions developed by providing stamped or coined surfaces having chevron-like patterns on both the upper and lower surface of the thrust plate 52. However, as has been found that such stamping or coining, applied to opposite surfaces of the thrust plate, is significantly more difficult to do accurately than stamping on only one side. Stamping on both sides of the plate, where the finished plate is to be used in a bearing having very tight tolerances, frequently results in defects either due to stress raisers or stress concentrations which influence the coining dye life. It is significantly easier to stamp the thrust plate on only one side.

Therefore, according to the preferred embodiment of this invention, only the side 72 of the thrust plate which is facing the recess axial surface of the sleeve 54 has the grooves coined or stamped thereon (as shown in FIG. 4B). The prior art would have also coined or stamped a grooved pattern on the opposite surface 70.

Instead, according to the present invention, the facing surface 68 of the counterplate (shown in FIG. 4A) would have a coined or stamped pattern of chevron-shaped grooves imprinted thereon. This could be done prior to inserting the counterplate 58 between the shoulders 62 of the sleeve. Thus, the coining or stamping operation could be easily and accurately carried out prior to assembly of the hydrodynamic bearing. Moreover, in order to be able to accurately imprint the grooves on the counterplate, the imprinted pattern would be printed over a circular surface which exceeds the diameter of the recess opening 100 in the sleeve.

As shown graphically in FIG. 4A, since the effective groove surface area is less in diameter than the actual grooved surface area on the counterplate 58, there is no problem with stress ridges or risers at the edges of the pattern. There is a far better groove definition over the surface of the counterplate and the pressure distribution created by the grooves will be more even and reliable. The region of the grooves which lies outside the diameter 100 will in fact overlie the upright ring 60 of the sleeve 54 and be covered thereby. To the extent that fluid might have a tendency to be forced out of the reservoir region 102 and over the top of the ring 60, the O-ring 66 impressed into the recess 65 will prevent any such fluid motion from passing beyond the edges of the counterplate and working its way up between the shoulder and counterplate and out into the surrounding atmosphere.

A final note with regard to the small recesses which appear cut back into the sleeve 54 at the lower edges of the shoulder 62 and the ring shaped upright 60. These recesses 104, 105 are provided so that the counterplate and thrust plate may be more easily inserted into what otherwise would be rectangular recess. It should further be noted that the recess 65 and its O-ring 66 appear only in FIG. 2A and not in FIG. 3. They are omitted from FIG. 3 for purposes of clarity in describing the relative locations of the coined surfaces; however, the use of the O-ring does provide an important sealing advantage in insuring that no fluid can be lost from the hydrodynamic bearing.

Other features and advantages of the invention may be found by a person who studies the present disclosure. For example, a rotating shaft design utilizing the hub features of the present invention where the rotating hub would be attached to the shaft at the opposite end of the shaft from the thrust plate would also fall within the scope of the invention. Therefore the scope of the invention is to be limited only by the following claims.

We claim:

1. An improved spindle motor comprising a rotating hub for supporting one or more discs in a disc drive, and a hydrodynamic bearing system for supporting said hub for rotation, said bearing system comprising a sleeve and a shaft fitted into an axial bore of said sleeve, said shaft and said sleeve rotating freely relative to one another, and together defining a journal bearing, said shaft further supporting an annular thrust plate, said thrust plate extending into a recess formed by an axial face stepped into said sleeve and a counterplate parallel to said axial face and said thrust plate and attached to said sleeve, said surface of said thrust plate facing said axial face of said sleeve having a groove pattern formed thereon, and said surface of said counterplate facing an opposed, second surface of said thrust plate having a grooved pattern thereon, to form an effective fluid pumping surface in said hydrodynamic bearing.

2. A spindle motor as claimed in claim 1 wherein said shaft is stationary, and said sleeve supports a hub for rotation with said sleeve about said stationary shaft and supported for rotation by a hydrodynamic bearing formed by said shaft, said thrust plate surface cooperating with said axial recess of said sleeve and said counterplate surface cooperating with said second surface of said thrust plate.

3. A spindle motor as claimed in claim 2 wherein said grooved surface of said counterplate extends beyond the region of said counterplate overlying said second surface of said thrust plate so that said groove surface on said counterplate is more easily formed.

4. A spindle motor as claimed in claim 3 wherein said sleeve has an upright annular ring at an end of said sleeve surrounding said thrust plate, said ring surrounding said thrust plate and cooperating therewith to define a reservoir for said hydrodynamic bearing, thereby forming said recess for said hydrodynamic bearing, said shoulders of said sleeve supporting said counterplate arising from said sleeve in a region axially beyond said annual ring so that said counterplate rests on an upright surface of said ring and between said shoulders of said sleeve.

5. A spindle motor as claimed in claim 4 wherein said annual ring includes an annular recess formed adjacent said axial face of said sleeve so that said thrust plate is more easily fitted into said sleeve-recess.

6. A spindle motor as claimed in claim 5 wherein said shoulder of said sleeve includes an annular recess adjacent the surface of said ring on which said counterplate is resting so that said counterplate is more easily fitted tightly into said shoulder of said sleeve.

7. A spindle motor as claimed in claim 5 wherein said sleeve includes an annular recess between said annular ring and said upright shoulder, and an O-ring formed of an elastic material fitted into said recess and filling the vertical extend of said recess and capture between a basis of said recess and said counterplate, so that lubricating fluid in a said hydrodynamic bearing cannot move beyond said ring to reach a region where said counterplate meets said shoulders of said sleeve.

8. A spindle motor as claimed in claim 5 wherein said groove surface of said counterplate extends beyond said recess formed to hold said thrust plate of said hydrodynamic bearing, and rests against said surface of said annular ring, so that said groove surface of said counterplate may be more easily formed on said counterplate without having ends of said grooves cooperating with any region of said second surface of said thrust plate or said recess for said hydrodynamic bearing.

9. A spindle motor as claimed in claim 2 wherein said counterplate is located between upright shoulders of said sleeve and located parallel to said thrust plate supported by said shaft.

10. A spindle motor as claimed in claim 9 wherein said shaft terminates in a region parallel to said annular thrust plate so that said planar surface of said counterplate forms a planar end of said hydrodynamic bearing.

11. A spindle motor as claimed in claim 1 wherein said grooved surface of said counterplate extends beyond the region of said counterplate overlying said second surface of said thrust plate so that said groove surface on said counterplate is more easily formed.

12. A spindle motor as claimed in claim 11 wherein said sleeve has an upright annular ring at an end of said sleeve surrounding said thrust plate, said ring surrounding said thrust plate and cooperating therewith to define a reservoir for said hydrodynamic bearing, thereby forming said recess for said hydrodynamic bearing, said shoulders of said sleeve supporting said counterplate arising from said sleeve in a region axially beyond said annual ring so that said counterplate rests on an upright surface of said ring and between said shoulders of said sleeve.

13. A spindle motor as claimed in claim 12 wherein said annual ring includes an annular recess formed adjacent said axial face of said sleeve so that said thrust plate is more easily fitted into said sleeve recess.

14. A spindle motor as claimed in claim 13 wherein said shoulder of said sleeve includes an annular recess adjacent the surface of said ring on which said counterplate is resting so that said counterplate is more easily fitted tightly into said shoulder of said sleeve.

15. A spindle motor as claimed in claim 13 wherein said sleeve includes an annular recess between said annular ring and said upright shoulder, and an O-ring formed of an elastic material fitted into said recess and filling the vertical extend of said recess and capture between a basis of said recess and said counterplate, so that lubricating fluid in a said hydrodynamic bearing cannot move beyond said ring to reach a region where said counterplate meets said shoulders of said sleeve.

16. A spindle motor as claimed in claim 15 wherein said groove surface of said counterplate extends beyond said recess formed to hold said thrust plate of said hydrodynamic bearing, and rests against said surface of said annular ring, so that said groove surface of said counterplate may be more easily formed on said counterplate without having ends of said grooves cooperating with any region of said second surface of said thrust plate or said recess for said hydrodynamic bearing.

17. A spindle motor as claimed in claim 15 wherein said end of said shaft supporting said thrust plate includes a central region of reduced cross section, said thrust plate being fitted onto said reduced cross section region of said shaft and is supported on a shoulder of said shaft defined by said shaft of normal cross section and said region of reduced cross section.

18. A spindle motor as claimed in claim 17 wherein said shaft region of reduced cross section includes an annular recess formed around said shaft so that said thrust plate may be more easily fitted onto said end of said thrust plate.

19. A spindle motor as claimed in claim 1 wherein said shaft is rotating with said sleeve and supports said hub on an end thereof,
   said shaft and hub being supported for rotation by said hydrodynamic bearing formed by said shaft and said sleeve,
   said thrust plate surface cooperating with said axial recess of said sleeve and said counterplate surface cooperating with said second surface of said thrust plate.

20. A spindle motor as claimed in claim 19 wherein said thrust plate is supported on said shaft distant from said hub and adjacent said counterplate supported on said sleeve.

21. A spindle motor as claimed in claim 20 wherein said counterplate is located between upright shoulders of said sleeve and located parallel to said thrust plate supported by said shaft.

22. A spindle motor as claimed in claim 21 wherein said shaft terminates in a region parallel to said annular thrust plate so that said planar surface of said counterplate forms a planar end of said hydrodynamic bearing.

* * * * *